United States Patent [19]
Crafts et al.

[11] Patent Number: 4,868,992
[45] Date of Patent: Sep. 26, 1989

[54] ANODE CATHODE PARALLELISM GAP GAUGE

[75] Inventors: Douglas E. Crafts, San Jose; Mark A. Leonov, Santa Clara, both of Calif.

[73] Assignee: Intel Corporation, Santa Clara, Calif.

[21] Appl. No.: 185,074

[22] Filed: Apr. 22, 1988

[51] Int. Cl.⁴ .............................................. G01B 7/02
[52] U.S. Cl. ........................................ 33/533; 33/645
[58] Field of Search ................ 33/168 B, 168 R, 501, 33/535, 645, 533, 562

[56] References Cited

U.S. PATENT DOCUMENTS 4,136,459  1/1979  Suss ....................................... 33/567
4,660,294  4/1987  Schmidt ................................ 33/533

FOREIGN PATENT DOCUMENTS 0162008  12/1981  Japan ..................................... 33/533

Primary Examiner—William A. Cuchlinski, Jr.
Assistant Examiner—Christopher W. Fulton
Attorney, Agent, or Firm—Blakely, Sokoloff, Taylor & Zafman

[57] ABSTRACT

The present invention is an anode cathode parallelism gap gauge. The gauge is for determining the relative parallelism between two planar surfaces such as an anode and cathode in a relative ion chamber. The gauge sits on the anode on three points and then has the cathode extended into its volume. The cathode will then contact the measuring arms, of which there must be at least three, that statically latch measurement values onto a scalar device. Thus, the present invention provides a reliable and clean method of determining parallelism and distance between an anode and cathode or other surfaces.

11 Claims, 2 Drawing Sheets

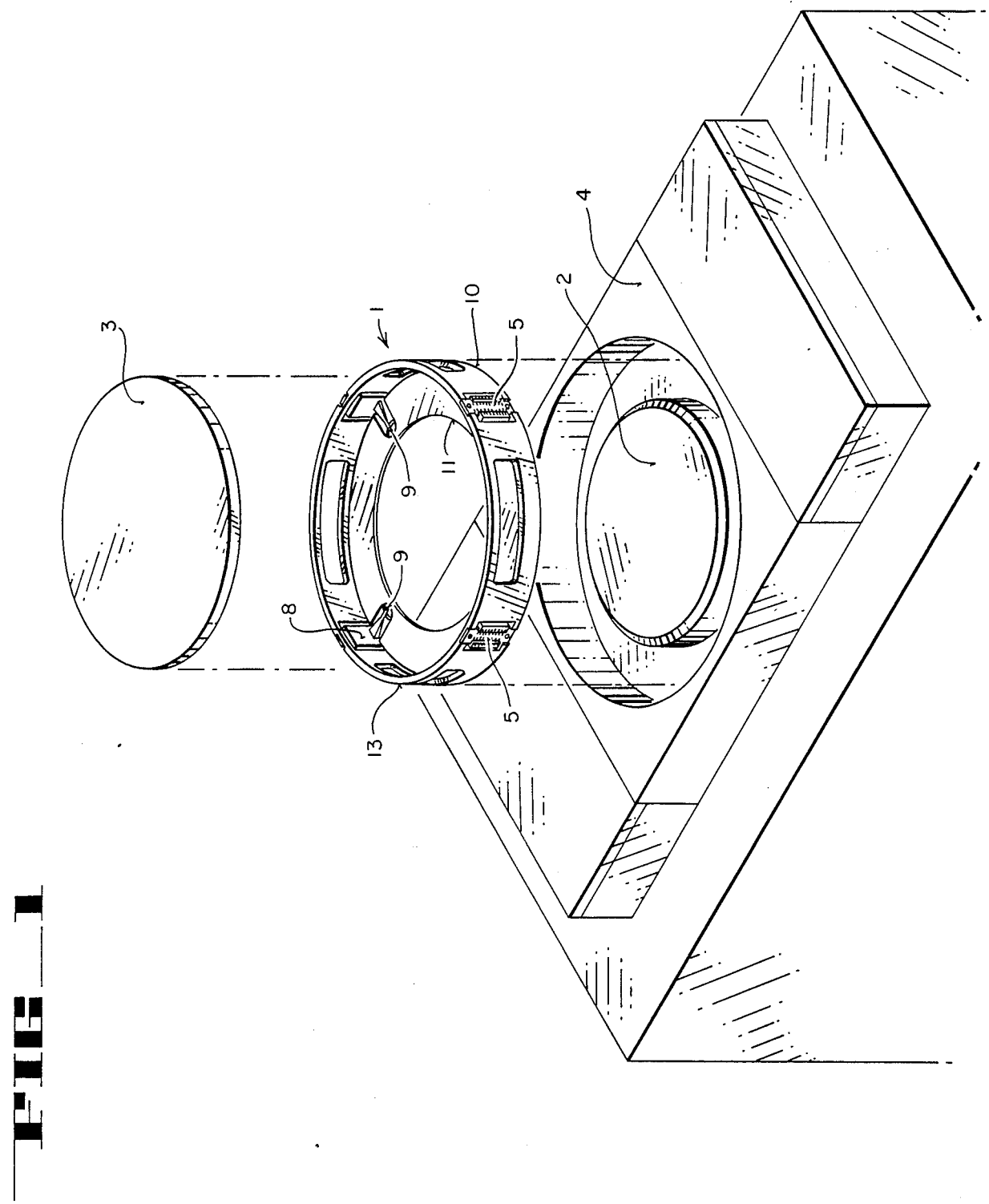

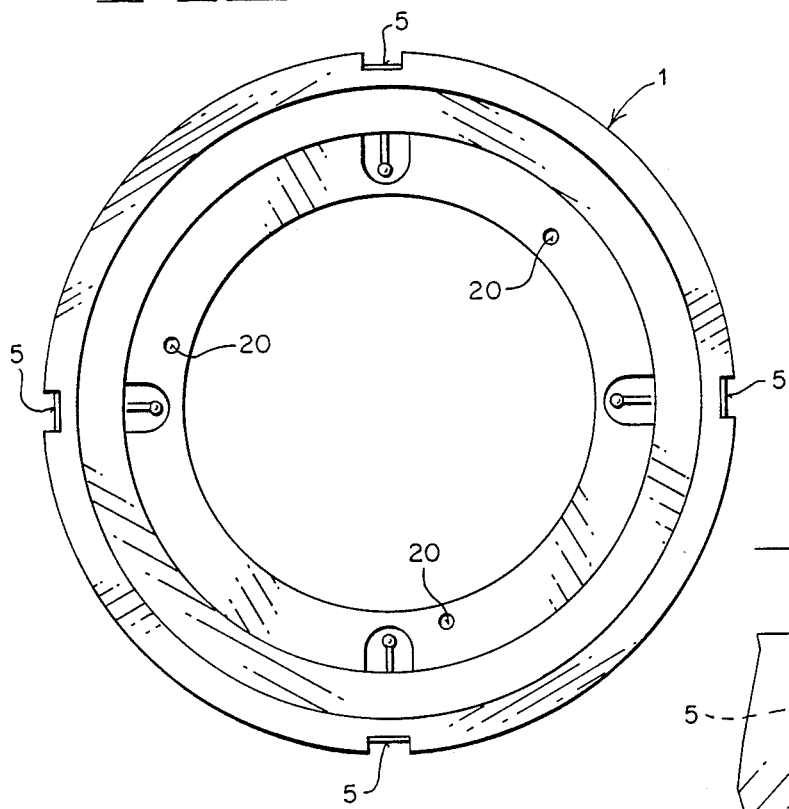
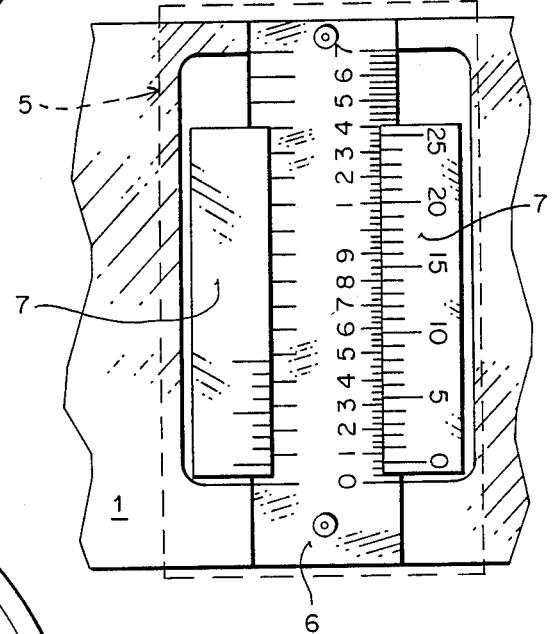
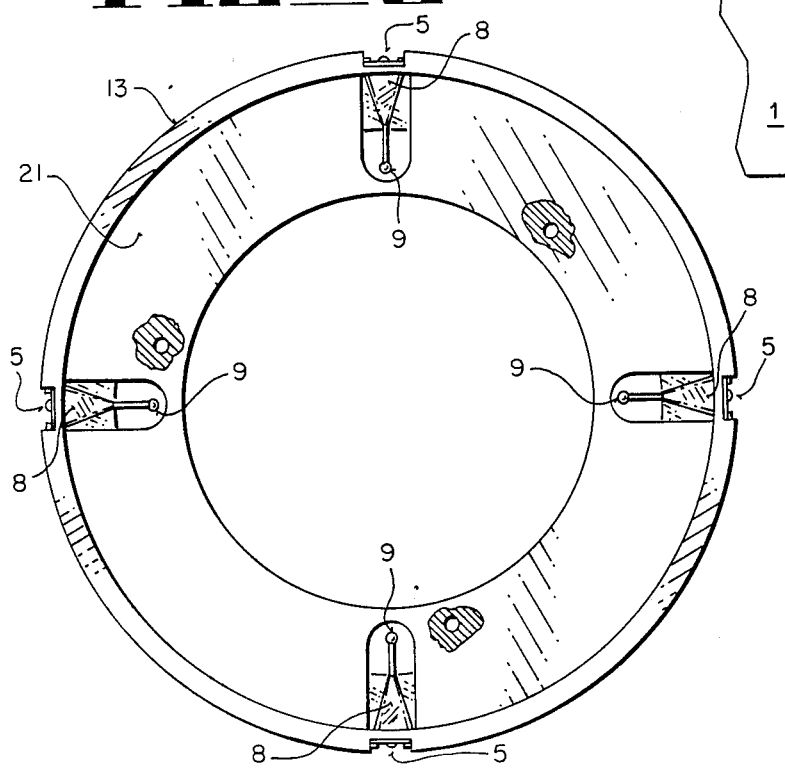

ANODE CATHODE PARALLELISM GAP GAUGE

BACKGROUND OF THE INVENTION

1. Field of the Invention

The field of the invention is that of parallelism measuring devices. More specifically the field is that of anode-cathode parallelism gap gauges.

2. Prior Art

The technique typically used to gauge parallelism and distance between anodes and cathodes in reactive etching chambers is that of compressing clay. Using this method clay balls are placed on an anode and the cathode is lowered towards the anode until the cathode touches the clay balls and compresses them. The clay figures produced by this prior art method are then measured in order to gauge the position of the anode and cathode at the various clay ball locations. Measuring the clay figures to determine the distance between the anode and cathode is an indirect measurement. This level of indirection compounds measurement errors.

The problems with this method include the indirect measurement, the imprecision of the clay balls as a measuring instrument, and the deposition of clay upon the anode and the cathode. The clay balls, after being pressed, may expand or contract, thereby distorting the measured value. The deposition of the clay on the anode and cathode requires that they be cleaned. The presence of clay oils or cleaning materials requires airing out the chamber for hours after the clay measurements. Also, clay is elastic so that the clay can spring back, destroying the accuracy of the measurement. The changing temperature of the clay can change the measured results. In addition, clay ball tests can not be repeated to test the accuracy of the initial measurement.

It is important to keep the anode and cathode relatively parallel for best results in an etching chamber. Also, it is necessary to check the distance between the anode and cathode independently of the chamber's instruments to guarantee proper calibration of the chamber.

What is needed is a parallelism gauge that both provides for accurate, direct measurement of the parallelism of and distance between the anode and the cathode. Also, what is needed is a parallelism gap gauge that avoids deposition of contaminating foreign particles upon the surfaces. One object of the present invention is to provide such an accurate parallelism gap gauge. Another object of the present invention is to provide a parallelism gap gauge that does not contaminate either of the surfaces measured.

SUMMARY OF THE INVENTION

The present invention provides for a parallelism gap gauge for the anode and cathode of a reactive ion chamber. The gauge sits atop the anode on three points, which define the plane of the anode. At least three measuring fingers are used to contact the cathode of the chamber. By lowering the cathode so that all of the measuring fingers are contacted, the distance between the anode and the cathode can be determined at each of these points. Then the gauge is removed from the chamber. Scalars attached to each measuring arm can be examined to calculate precisely the parallelism of and distance between the anode and the cathode measured.

DESCRIPTION OF THE DRAWINGS

FIG. 1 is a perspective view of the present invention.
FIG. 2 is a bottom view of the present invention.
FIG. 3 is a top view of the present invention.
FIG. 4 is a frontal view of the scalar rule subassembly of the present invention.

DETAILED DESCRIPTION OF THE INVENTION

The present invention describes an anode cathode parallelism gap gauge. In the following description numerous specific details are set forth in order to provide a thorough understanding of the present invention. It will be obvious, however, to one skilled in the art that the present invention may be practiced without these specific details. In other instances, well known methods and structures have not been described in detail so as not to unnecessarily obscure the present invention.

FIG. 1 shows a perspective view of the preferred embodiment of the present invention. The anode cathode parallelism gauge 1 is shown between cathode 3 and anode 2. Anode 2 is mounted on base 4. Cathode 3 is adjustable in its vertical position directly over anode 2. By mechanical means cathode 3 may be raised or lowered over anode 2. The gauge 1 is placed so that inner ring 11 rests on the upper surface of anode 2.

The inner diameter of gauge 1's outer wall 13 is larger than the circumference of cathode 3 such that cathode 3 can be lowered into the interior of gauge 1. Measuring fingers 8 extend perpendicularly from the inner surface of the outer wall 13 of gauge 1. In the preferred embodiment four measuring fingers are used, although any number greater than or equal to three may be used to give accurate results.

There must be at least three fingers to contact cathode 3, because three points are required to define a planar surface. Four points are used in the preferred embodiment because there are four motors that control the vertical movement of cathode 3. The four measuring fingers can be aligned with four rods which guide the vertical movement of the four motors. Thus, each motor can be adjusted according to the measurement taken at its corresponding position of the gauge.

Each measuring finger 8 is coupled to a column of scalar rule subassembly 5 so that each finger's position can be changed vertically, although it cannot be changed horizontally. The measuring finger 8 and its corresponding column are friction fit so that the measuring finger 8 effectively latches in position. Contact point 9 is located at the end of each measuring finger 8. The contact point 9 protrudes above the highest plane formed by any part of the measuring finger 8.

Scalar rule subassemblies 5 are mounted on the exterior of outer wall 13 and coupled to the measuring fingers 8. The scalar rule subassembly 5 is calibrated so that accurate measurements can be taken on it. The measurements depend on the placement of contact point 9, which is located at the end of measuring finger 8.

The gauge 1 is cylindrical in shape, and has an outer diameter of approximately 10.4 inches. The inner diameter of outer wall 13 is approximately 9.2 inches. The diameter of inner ring 11 is approximately 6.25 inches. The height of the gauge 1 is approximately 2.13 inches.

FIG. 2 shows a bottom view of gauge 1. On the bottom surface of gauge 1 are three support points 20. Three points define a plane, so by having only three support points 20 it is assured that the scalar rule subassemblies 5 sit on a planar reference.

FIG. 3 is a top view of gauge 1. Between outer wall 13 and the void in the center is an inner disc 21. Protruding inwardly from outer wall 13 are four measuring fingers 8. Contact points 9 are located at the end of each measuring finger 8. For the most accurate results it is best to have contact points 9 meet cathode 3 near the outer diameter of cathode 3. The outer diameter of cathode 3 lies close to the inner circumference of inner disc 21, which is the inner ring 11 of FIG. 1. By virtue of the finger's latching property, after the cathode enters the interior volume of gauge 1 the measuring fingers 8 are pushed down to exactly the point of the cathode's farthest entry. Then the cathode is raised out of the interior volume of gauge 1 and the gauge 1 is removed from the chamber. Movement of the gauge does not distort the accuracy of the measurement, the measuring fingers 8 do not move on account of the friction fit. After removal the scalar rule subassemblies 5 show the measurement information about the distances at all four contact points between cathode 3 and anode 2. Given these distances, the parallelism of and distance between cathode 3 and anode 4 are determined.

The gauge 1 is basically cylindrical in shape. The inner disc 21 is located near the bottom of gauge 1. The inner disc 21 is perpendicular to the inner wall of gauge 1, and defines a circle in the cylinder. Thus, the outer wall 13 is perpendicular to the plane defined by support points 20. In the preferred embodiment, the outer wall 13 has holes placed in it that allow for manual grasping of the gauge 1.

In the preferred embodiment, the four measuring fingers are located at 90° angles from each other. The support points are located at 120° angles. The support points are at a 15° phase shift in relation to the measuring fingers. That is, if each of the measuring fingers were assigned a coordinate direction, one support point would lie 45° from the north and east, the second at 15° eastward from the south, and the third 15° northward from the west. This an optimal arrangement for aligning a plane defined by four points with a plane defined by three points, with the circles defined by the measuring fingers and the support points having a common center.

FIG. 4 shows the operation of the scalar rule subassembly 5. The scalar rule subassembly 5 comprises ruled column 6 and ruled arm 7. Ruled column 6 is fixed in its position as a part of the gauge. Ruled arm 7 is coupled with measuring finger 8 such that ruled arm 7 moves vertically up and down ruled column 6 as its measuring finger moves. There is friction between the finger and column, the friction calibrated such that the force of the cathode's motors is greater than the resistance, but that resistance is still greater than the force of gravity.

In the preferred embodiment, the ruled column 6 is scaled in increments of 0.025 inches. The ruled arms 7 are scaled in 25 segments to measure to the exact thousandth of an inch. A ruled arm 7 can also be used to measure another fraction of the intervals of ruled column 6, for example one eighth of an interval.

The exact measurement is made as follows. First the measurement is made for the interval by noting the position of the zero mark of ruled arm 7 on the scale of ruled column 6. For example, if the zero mark was positioned between the first and second line past the three mark's line then the measured height would be in the interval of 0.325–0.350. The exact measured height is found by matching collinear scale lines on ruled column 6 and ruled arm 7. That is, two scale lines that appear to form one straight line. Using the previous example, further suppose that scale line 13 of the ruled arm 7 was collinearly aligned with a scale line of ruled column 6. That represents the fact the measured height is 0.013 greater than the lowest point of the interval given by ruled column 6. Using the previous example, the observer would add 0.325, taken from the ruled column 6, to 0.013, taken from ruled arm 7, arriving at the measured height value of 0.338 inches. This method uses what is known as the Vernier principal.

In the preferred embodiment, the measuring fingers may travel as far down so as to be level with the upper surface of the inner disc 21. The contact point is a spherically-shaped point at the end of the finger. It has a point on its surface where the plane is tangent at that point is perpendicular to the upper surface of the measuring finger. The distance between that point and the upper surface is approximately 0.015 inches.

The gauge 1 operates as follows. The gauge 1 is placed over an anode 2 of a reactive ion etcher. The measuring arms 8 are moved up as high as possible, as it is necessary for the cathode 3 to touch all four of the finger's contact points 9 to obtain reliable data. Next, the cathode 3 is lowered into the gauge's volume. It is suggested that the cathode 3 be lowered so as to come within approximately 1 cm from the inner disc 21. Following that suggestion, all four measuring fingers 8 are in contact with the surface of the cathode 3. Then, the cathode 3 is withdrawn from close proximity of the anode 2 and gauge 1. Precise measurements can then be taken.

Having four measurements of distance from a precise location provides information concerning the parallelism of and gap between an anode and cathode. If the anode and cathode surfaces are parallel then the four measurements are equal. Any other result indicates that the surfaces are not parallel. Based on the measurements, the motors that control the movements of the cathode can be modified to make the cathode's surface parallel to the anode's surface. This is especially effective when each measuring finger is aligned with one of the motors. The scalar rule subassembly which corresponds to a particular motor is used to adjust the motor. The deviation of the measurement taken at the motor's position determines the exact adjustment needed. This deviation is calculated as a function of the difference between the single measured value and the mean value of all the measurements.

As an example, two sets of measurements are considered. The first set has four measured values of 0.178, 0.178, 0.178, and 0.178. This first set indicates the surfaces are parallel. Even if one measured value was 0.179 or 0.177, there would be a strong presumption the surfaces were parallel, as the possibility of small measurement errors exists. The second set has four measured values of 0.325, 0.319, 0.323, and 0.327. This second set indicates the surfaces are not parallel. The mean of the second set is 0.322. This value can be used to adjust the four motors which control the cathode. Additionally, the distance measurements can be compared against the etcher's measured distance to check the etcher's calibration.

The preferred embodiment of the present invention is comprised of the following materials. The measuring fingers 8 are made of hardened tool steel. However, it would be obvious to one skilled in the art that any of a variety of metallic materials, such as hardenable stainless steel, beryllium alloys, bronze, and titanium, could be used. The gauge 1 itself is made of aluminum (6061-T6), although reinforced nylon, acetal plastic, magnesium, or metallic materials could be used. The scalar rule subassembly 5 is made of hardenable stainless steel, although any equivalent material could be used. The support points 20 are made of brass, although any metallic material could be used. The ruled column 6 is coupled to the gauge by screws made of cold-rolled carbon steel, although other similar materials can be used.

Thus, an anode cathode parallelism gauge is described.

We claim:

1. A parallelism gap gauge for determining the relative parallelism and distance between a first and second planar surfaces comprising;
    a gauge housing having an outer and an inner wall;
    an inner member coupled to said inner wall of said gauge housing, wherein at least three support points are provided on one surface of said inner member such that said first planar surface resides on said support points;
    at least three measuring means coupled to said outer wall of said gauge housing for determining a distance between said first and second planar surfaces, each of said measuring means each having a finger extending inwardly toward and above a surface of said inner member opposite said one surface and said second planar surface residing on said fingers;
    each of said measuring means having dynamic adjustability to measure a distance separating said first and second planar surfaces.

2. The gauge described in claim 1 where there are exactly three of said support points arranged to form the corners of an equilateral triangle.

3. The gauge described in claim 2 where there are exactly four of said measuring means.

4. The gauge described in claim 3 where said measuring means are arranged to form the corners of a square.

5. The gauge described in claim 4 where said measuring means are placed under motors of a cathode of an etching chamber.

6. The gauge described in claim 5 where each of said measuring means is a finger coupled to a ruled column.

7. The gauge described in claim 6 where said ruled column measures height in intervals and said arm measures the exact height within said intervals.

8. The gauge described in claim 7 where said ruled column is scaled to intervals of 0.025 inches and said finger is scaled to determine the height within said intervals to 0.001 of an inch.

9. The gauge described in claim 8 where said planar surfaces are an anode and a cathode of a reactive ion chamber.

10. The gauge described in claim 9 where the outer diameter of said gauge is approximately 10.4 inches and the inner diameter of the outer wall of said gauge is approximately 9.2 inches.

11. A parallelism gap gauge for determining the relative parallelism and distance between an anode and a cathode of an etcher, said gauge comprising:
    a cylindrical housing having an outer and an inner wall;
    an inner disc coupled to said cylindrical housing near the bottom of said cylindrical housing, said inner disc having three support points for placing said gauge upon said anode such that the plane of said anode defines a circle on said cylindrical housing;
    at least three measuring fingers;
    at least three scalar rule subassemblies coupled to said outer wall, such that each of said measuring fingers is coupled to a corresponding scalar rule subassembly;
    said scalar rule subassemblies coupled to said measuring fingers such that said measuring fingers have dynamic adjustability and having static friction to keep said measuring finger's position stable as said cathode is placed upon said measuring fingers;
    said scalar rule subassemblies marked such that measurements can be taken at least to a precision of one one-thousandths of an inch.

* * * * *